United States Patent
Stewart et al.

(10) Patent No.: US 9,116,749 B2
(45) Date of Patent: Aug. 25, 2015

(54) METHOD FOR DYNAMIC ON DEMAND STARTUP OF A PROCESS OR RESOURCE

(75) Inventors: Randall Stewart, Chapin, SC (US); Renwei Li, Fremont, CA (US); Xuesong Dong, Pleasanton, CA (US); Hongtao Yin, Fremont, CA (US); Huaimo Chen, Bolton, MA (US); Bisong Tao, San Jose, CA (US); Yang Yu, San Ramon, CA (US); Weiqian Dai, San Jose, CA (US); Ming Li, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 507 days.

(21) Appl. No.: 13/080,248

(22) Filed: Apr. 5, 2011
(Under 37 CFR 1.47)

(65) Prior Publication Data

US 2012/0137012 A1    May 31, 2012

Related U.S. Application Data

(60) Provisional application No. 61/321,066, filed on Apr. 5, 2010, provisional application No. 61/324,610, filed on Apr. 15, 2010.

(51) Int. Cl.
*G06F 15/16* (2006.01)
*G06F 9/50* (2006.01)
*H04L 12/773* (2013.01)

(52) U.S. Cl.
CPC .............. *G06F 9/5061* (2013.01); *H04L 45/60* (2013.01)

(58) Field of Classification Search
CPC .............................. H04L 45/60; G06F 9/5061

USPC ......................................................... 709/201
See application file for complete search history.

(56) References Cited

U.S. PATENT DOCUMENTS

| | | | |
|---|---|---|---|
| 5,774,660 A | 6/1998 | Brendel et al. | |
| 5,787,250 A | 7/1998 | Badovinatz et al. | |
| 7,039,694 B2 * | 5/2006 | Kampe et al. | 709/222 |
| 7,136,924 B2 | 11/2006 | Dauger | |
| 7,203,944 B1 | 4/2007 | van Rietschote et al. | |
| 7,421,578 B1 | 9/2008 | Huang et al. | |
| 2004/0064568 A1 | 4/2004 | Arora et al. | |
| 2004/0073933 A1 | 4/2004 | Gollnick et al. | |
| 2005/0267943 A1 * | 12/2005 | Castaldi et al. | 709/206 |
| 2006/0056383 A1 * | 3/2006 | Black et al. | 370/350 |
| 2006/0155802 A1 | 7/2006 | He et al. | |

(Continued)

FOREIGN PATENT DOCUMENTS

WO      0182678 A2    11/2001

OTHER PUBLICATIONS

Tahir, M., et al., "Cisco IOS XR Fundamentals," Cisco Press, 2009, 506 pages.

(Continued)

*Primary Examiner* — David X Yi
(74) *Attorney, Agent, or Firm* — Conley Rose, P.C.; Grant Rodolph; Brandt D. Howell

(57) ABSTRACT

An apparatus comprising a processor configured to startup a new process on a peer processor to off-load a load of a local process on the processor in a dynamic manner based on monitoring an amount of resources used by the processor, wherein the startup of the new process on the peer processor is initiated when the amount of resources used by the local process reaches a threshold.

17 Claims, 8 Drawing Sheets

(56) References Cited

U.S. PATENT DOCUMENTS

| | | | |
|---|---|---|---|
| 2008/0046890 A1 | 2/2008 | Dunlap et al. | |
| 2008/0104608 A1* | 5/2008 | Hyser et al. | 718/105 |
| 2008/0209067 A1* | 8/2008 | John et al. | 709/231 |
| 2008/0270610 A1 | 10/2008 | John et al. | |
| 2009/0063665 A1* | 3/2009 | Bagepalli et al. | 709/222 |
| 2009/0063686 A1* | 3/2009 | Schmidt et al. | 709/227 |
| 2012/0136944 A1 | 5/2012 | Stewart et al. | |
| 2012/0209989 A1 | 8/2012 | Stewart et al. | |
| 2013/0064088 A1 | 3/2013 | Yu et al. | |

OTHER PUBLICATIONS

Tanenbaum, A., et al., "Distributed Systems Principles and Paradigms, Second Edition," Pearson/Prentice Hall, 2007, 704 pages.

Stewart, R., et al., "Internal Router Capability Protocol (IRCP)," draft-stewart-xxxx-ircp-00.txt, Jan. 21, 2011, pp. 1-28.

Bradner, S., "Key Words for Use in RFC's to Inicate Requirement Levels," RFC 2119, Mar. 1997, pp. 1-3.

Ramakrishnan, K., et al., "A Proposal to Add Explicit Congestion Notification (ECN) to IP," RFC 2481, Jan. 1999, pp. 1-26.

Stewart, R., et al., "Stream Control Transmission Protocol," RFC 2960, Oct. 2000, pp. 1-126.

Ramakrishnan, K., et al., "The Addition of Explicit Congestion Notification (ECN) to IP," RFC 3168, Sep. 2001, pp. 1-64.

Stewart, R., "Stream Control Transmission Protocol," RFC 4960, Sep. 2007, pp. 1-153.

Rodrigues, L, et al., "A Low Level Processor Group Membership Protocol for LANS," Technical University of Lisboa, 1993, pp. 541-550.

Foreign Communication From A Related Counterpart Application, International Search Report, PCT/US2011/031252, Aug. 22, 2011, pp. 1-5.

Foreign Communication From a Related Counterpart Application, Written Opinion, PCT/US2011/031252, Aug. 22, 2011, pp. 1-7.

Foreign Communication From A Related Counterpart Application, International Search Report, PCT/US2011/031258, Jul. 5, 2011, pp. 1-4.

Foreign Communication From A Related Counterpart Application, Written Opinion, PCT/US2011/031258, Jul. 5, 2011, pp. 1-9.

Foreign Communication From A Related Counterpart Application, International Search Report, PCT/US2011/031261, Jul. 4, 2011, pp. 1-4.

Foreign Communication From A Related Counterpart Application, Written Opinion, PCT/US2011/031261, Jul. 4, 2011, pp. 1-9.

Office Action dated Mar. 14, 2013; U.S. Appl. No. 13/080,172, filed Apr. 5, 2011, 31 pages.

Office Action dated Mar. 25, 2013; U.S. Appl. No. 13/080,172, filed Apr. 5, 2011, 30 pages.

* cited by examiner

METHOD FOR DYNAMIC ON DEMAND STARTUP OF A PROCESS OR RESOURCE

CROSS-REFERENCE TO RELATED APPLICATIONS

The present application claims the benefit of U.S. Provisional Patent Application No. 61/321,066 filed Apr. 5, 2010 by Renwei Li, et al. and entitled "In-service Process Migration and Virtual Router Migration," and U.S. Provisional Patent Application No. 61/324,610 filed Apr. 15, 2010 by Renwei Li, et al. and entitled "In-service Process Migration and Virtual Router Migration," both of which are incorporated herein by reference as if reproduced in their entirety.

The present application is related to commonly assigned U.S. patent application Ser. No. 13/080,172 filed even date herewith by Randall Stewart, et al. and entitled "Method for Dynamic Discovery of Control Plane Resources and Services" and to commonly assigned U.S. patent application Ser. No. 13/080,194 filed even date herewith by Randall Stewart, et al. and entitled "Method for Dynamic Migration of a Process or Services From One Control Plane Processor to Another," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Typical routing and switching platforms comprise about one or about two fixed control plane processors, e.g., route processors (RPs). Some routers or switches also comprise line processors (LPs). The control plane processors may run a plurality of processes and handle load in substantially a static or fixed manner, where processes require substantial manual configuration. In today's modern hardware, more control plane processors are being added to "scale up" a router or switch to handle more network traffic. For example, more than about three control plane processors may be used in network components by adding or plugging additional computation elements (CEs), such as LPs, e.g., with single or multiple core control plane processors. As the cost of CEs decreases, the quantity of control plane processors that can be used in the network components increases, and thus the control plane processors' capabilities to run more processes and services increases. To benefit from such increase in capability, a more dynamic configuration model may be needed to allow automatic configuration of new control plane processors, adding new processes, and moving or removing existing processes.

SUMMARY

In one embodiment, the disclosure includes an apparatus comprising a processor configured to startup a new process on a peer processor to off-load a load of a local process on the processor in a dynamic manner based on monitoring an amount of resources used by the processor, wherein the startup of the new process on the peer processor is initiated when the amount of resources used by the local process reaches a threshold.

In another embodiment, the disclosure includes a network component comprising a first processor configured to implement a first agent process that selects a local process to migrate a load from and requests starting a remote process upon detecting overloaded resources on the first processor; and a second processor configured to implement a second agent process that receives the request, wherein the second agent process is further configured to start a new process on the second processor to handle load migrated from the first processor if the second processor comprises a process that is capable of implementing at least one service implemented by the local process and the second process includes sufficient resources to handle the migrated load, and wherein the local process is selected based on available resources for the local process.

In a third aspect, the disclosure includes a method comprising receiving at a first processor a request to transfer load from a second process on a second processor; starting a first process on the first processor to handle the load from the second process on the second processor when a process capable of implanting at least one service implemented by the second process is not running on the first processor; and receiving the load from the second processor.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Current architectures or models for configuring processors and processes on network components, e.g., routers or switches, may be static and may not support dynamic configuration and setting processes and services to run on the processors, e.g., without manual intervention. Such static configuration schemes may require manual intervention to add new processes and remove or change existing processes, e.g., upon adding new processors. The terms control plane processor, processor, and CE are used herein interchangeably. The terms process and service are also used herein interchangeably.

Disclosed herein is a system and method for supporting dynamic startup of a process or resource on a processor in a network component without manual intervention. A process or service may be started automatically according to the process resource conditions, which may include the amount of memory usage, the amount of central processing unit (CPU) usage, or both. A dynamic process startup method may be performed on-demand by monitoring a plurality of processes that run on one or more processors and their resources. A process manager (PM) or an Internal Router Capability Protocol (IRCP) agent may monitor the processes and their resources and start up a new process or change an existing process, e.g., if the resource of a process reaches a critical level. The PM or IRCP agent may also inform peer PM or IRCP agent on a different processor of changes to a local process, such as the deletion or addition of a process.

Figure 1:
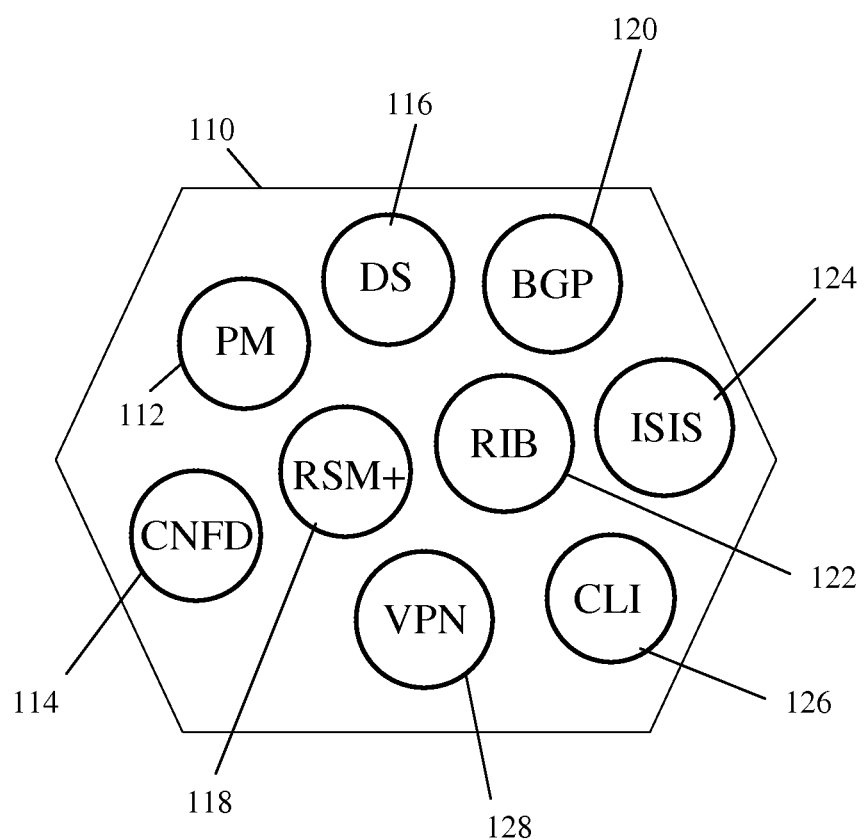
FIG. 1 is a schematic diagram of an embodiment of a plurality of associated processes.

FIG. 1 illustrates an embodiment of plurality of associated processes 100, which may run on a processor 110. The processor 110 may be a static control plane processor, e.g., a RP card, or a removable control plane processor, e.g., a LP card, which may be located in a network component, e.g. a switch or a router, a data server, or any other network component. The processor 110 may be any CE that is configured to implement or run one or more processes 100, which may handle services or functions related to the processor's operations. Specifically, the processes 100 may comprise a PM 112 that is configured to start up and manage other processes and/or services on the processor 110. The processes 100 may also comprise other processes that may run on the processor 110 and provide a plurality of functions/services, such as for implementing a border gateway protocol (BGP) 120, a routing information base (RIB) 122, an Intermediate System to Intermediate System (IS-IS) protocol 124, a virtual private network (VPN) 128, a command-line interface (CLI) 126, a Directory Service (DS) 116, a Configure Daemon (CNFD) 114, a Resource Manager (RSM+) 118, or combinations thereof.

The PM 112 may be configured to manage initial system startup of other processes and to monitor the other processes 114, 116, 118, 120, 122, 124, 126, 128 that run on the processor 110. The PM 112 may monitor the other running processes to verify that the processes are running appropriately and not failing, e.g., due to lack of resources. The PM 112 may also restart any failed process or kill any process, such as a run-away process, e.g., to save resources. Additionally, the PM 112 may be configured to communicate with other processes, e.g., peer PMs, that run on peer processors (not shown) using an Internal Router Capability Protocol (IRCP). IRCP allows existing software to automatically find new hardware elements and discover their capabilities. Furthermore IRCP allows older entities to migrate load to new entities thereby automatically using the new processing capacity which simplifies both deployment and administration while providing a high degree of scalability and availability. The peer processors may be similar to the processor 110 and may be located on the same network component of the processor 110, e.g., on the same switch or router.

The IRCP may be configured to allow the dynamic configuration of processes, including PMs, on one or more processors in a network component, e.g., for routing and/or switching operations. The IRCP may allow a network administrator to add a new CE or multiple CEs to a network component, e.g., to expand routing and switching capabilities. The IRCP may allow the software existing on the network component to automatically find new hardware elements and discover their capabilities. Further, the IRCP may allow CEs to start, remove, and/or change processes and migrate load of processes to other CEs, in a dynamic or automatic manner without manual configuration. Thus, a router or switch may make use of new processing capacity due to adding new CEs without waiting for manual reconfiguration. The IRCP may simplify network deployment and/or administration while providing an improved degree of scalability and availability, e.g., in comparison to current static configuration schemes.

Figure 2:
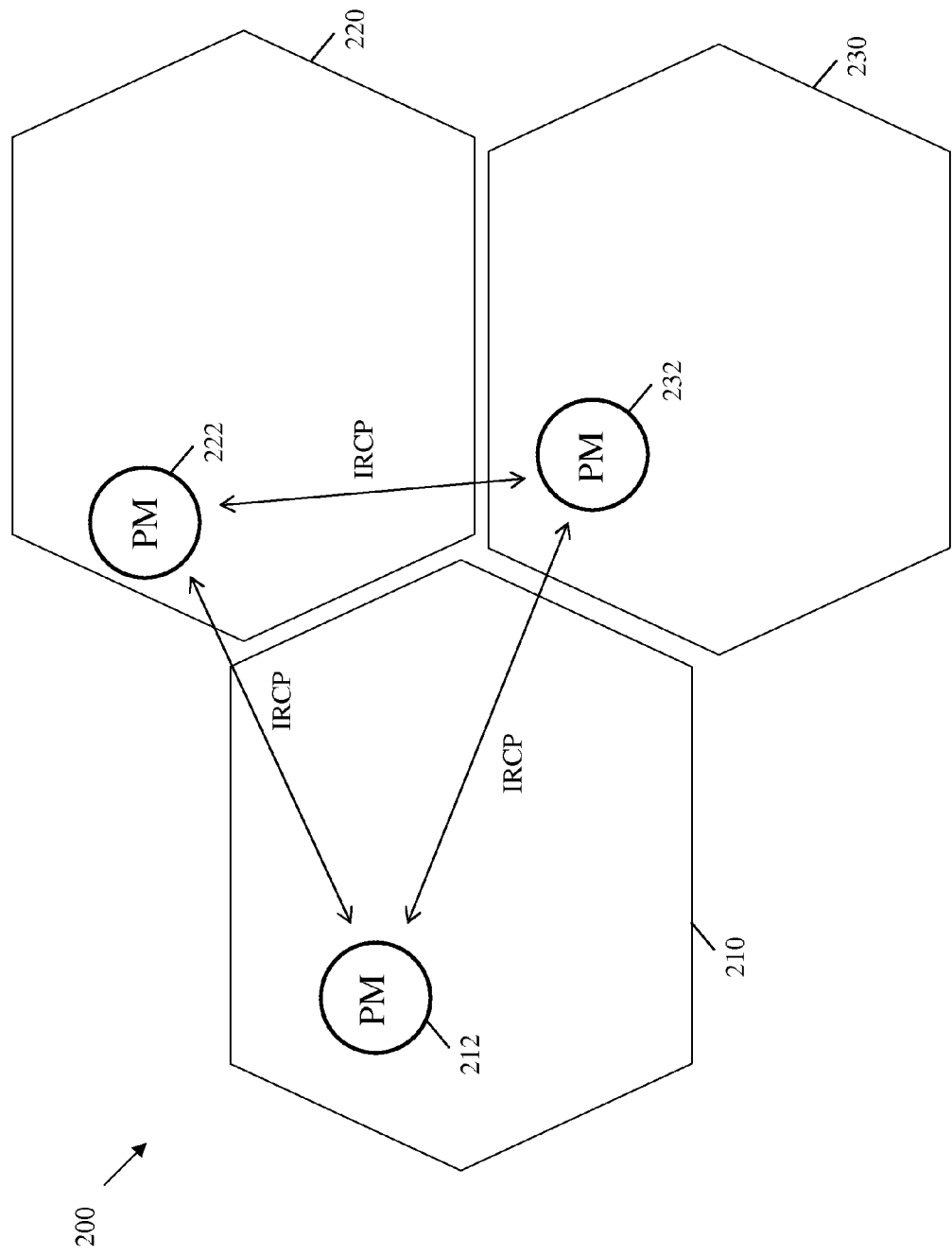
FIG. 2 is a schematic diagram of an embodiment of a plurality of associated control plane processors.

FIG. 2 illustrates an embodiment of a plurality of associated control plane processors 200, which may be located on a network component, such as a switch or a router. The processors 200 may comprise a first processor 210, a second processor 220, and a third processor 230, which may communicate with one another. The first processor 210, the second processor 220, and the third processor 230 may be CEs that include RP cards and/or LP cards. The processors 200 may comprise single core processors or CEs, multiple core processors or CEs, or both. The first processor 210, the second processor 220, and the third processor 230 may comprise a first PM 212, a second PM 222, and a third PM 232, respectively, which may run on the corresponding processors 200 and may be configured similar to the PM 112.

The processors 200 may use the IRCP to dynamically learn about one another, request start services from one another, migrate services or part of services between one another, and/or distribute load information between them. The IRCP may be implemented on a separate process in each of the processors 200 or as part of other services. In an embodiment, the IRCP may be implemented by the first PM 212, the second PM 222, and the third PM 232. The first PM 212, the second PM 222, and the third PM 232 may use the IRCP to dynamically discover one another, any processes of the processors 200, and their capabilities. The first PM 212, the second PM 222, and the third PM 232 may also use the IRCP to start or change processes and migrate processes between the processors 200.

In an embodiment, an IRCP agent may be configured to initiate process startup and exchanges with peer IRCP agents. The IRCP agent may correspond to a PM, such as the PMs described above, or may be a separate process running on the processor. The IRCP agent may be configured to send a plurality of subsequent announcements, e.g., in a periodic manner, to make other peer IRCP agents aware of the sender's presence. An IRCP agent may run a timer to ensure the periodic transmission of announcements. The timer may be set to a sum of an interval value and random jitter. The interval value may be defined in an IRCP parameter IRCP.ANNOUNCEMNT. For example, the IRCP.ANNOUNCEMENT may have a value of about 60 seconds. The interval value may be changed based on network conditions. The random jitter may range from about zero seconds to about four seconds.

Upon sending each announcement, the IRCP agent may also check if the corresponding processor is overloaded, e.g., if the resources of the local processor, such as memory and/or CPU usage, have reached a threshold. If the processor is overloaded then the IRCP agent may start a migration process to move a process load from the local processor to a peer processor and thus free some of the resources on the local processor. Specifically, the IRCP agent may perform the following procedures at each time interval or upon sending each announcement:

The IRCP agent may examine a plurality of load samples that may be collected on the processor. If less than a predetermined number of load samples have been collected, then the IRCP agent may not take further action. The predetermined number may correspond to a complete set of samples and may be defined in an IRCP system parameter IRCP.HISTORY.SIZE, which may have a value of about five samples. For example, the IRCP agent may not request a migration of process load until at least one complete set of samples have been collected.

The IRCP agent may determine if a migration state machine that may be used to implement process load migration is already running and thus is not available. If the migration state machine is already active or running, then the IRCP agent may not take further action.

The IRCP agent may set the values of two system variables, overload-count and current-overloaded, to about zero.

The IRCP agent may assess a plurality of load sample records that may be maintained and updated during the announcement period. Each of the IRCP.HISTORY.SIZE records, e.g., for all the process samples, may be examined and the idle time CPU percentage may be compared against a high water mark value, e.g., a threshold. The high water mark value may be defined in an IRCP system parameter IRCP.CPU-HIGH-WATER, which may have a value equal to about 30 percent. The high water mark value may indicate the percentage of idle CPU time usage versus total CPU time usage. If the idle time CPU percentage is smaller than or equal to the high water mark value, then overload-count may be incremented. If the sample being examined is the current or most recently acquired sample and the idle time CPU percentage is smaller than or equal to the high water mark value, the current-overloaded may be incremented.

The IRCP agent may check if the variable overload-count variable is greater than or equal to a predetermined number and the variable current-overloaded is not equal to about zero. If this condition is true, then the processor may be overloaded and a processor or load migration may be needed. The predetermined number may be defined in an IRCP system parameter IRCP.OVER-LOAD-SAMPLES, which may have a value of about three samples. A process migration may be attempted by signaling the migration state machine to leave its idle state due to a CPU overload condition.

If the CPU is not overloaded, then the IRCP agent may examine next the memory space for the processor. If the current sample period indicates that the amount of idle memory usage percentage is smaller than or equal to a high water mark value, then the processor may be overloaded and a migration may be needed. The high water mark value may be defined in an IRCP system parameter IRCP.MEM-HIGH-WATER, which may have a value of about 20 percent. The high water mark value may indicate the percentage of idle memory time usage versus total memory time usage. A process migration may be attempted by signaling the migration state machine to leave its idle state due to a CPU overload condition.

Further, the IRCP agent may be configured to communicate with new and existing peers (other IRCP agents) to keep track of what processes are available on a group of peers. The IRCP agent may watch for new peers and initiate service exchange requests to new newly discovered peers, respond to service exchange requests from new peers, or both. The IRCP agent may maintain a peer service list that indicates the processes available at the peers and may also inform peers of any changes in its services or processes. If the IRCP agent is configured with new services dynamically and may have services removed, then the IRCP agent may send an IRCP service change message to a group of peers when a service change occurs. If the IRCP agent is configured statically and may only change with a restart, then the IRCP agent may not send the IRCP service change message but may still be capable of receiving and processing an IRCP service change message. The IRCP may also monitor the processes to allow the migration state machine to make decisions about which processes to migrate load from. The IRCP agent may monitor the processes periodically with appropriate sample jitter and may use operating system specific procedures to extract process load information.

Figure 3:
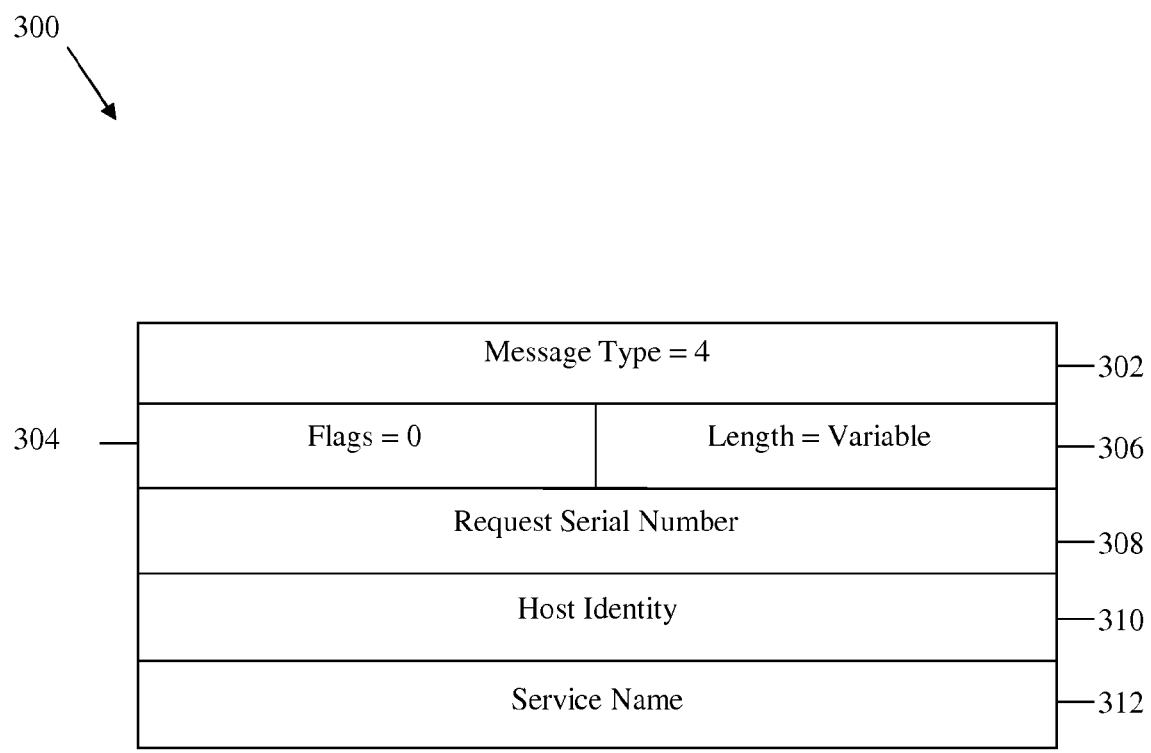
FIG. 3 is a schematic diagram of an embodiment of a start service request.

FIG. 3 illustrates an embodiment of a start service request 300, which may be an IRCP start service request message. The start service request 300 may be sent by an IRCP agent to a peer IRCP agent to request the start of a service or process on the peer's processor. For example, when the IRCP agent determines that the local processor is overloaded, as described above, the IRCP agent may send the start service request 300 to the peer IRCP agent to request starting a new service or process on the peer's processor. The IRCP agent may then migrate a process load from the IRCP agent's local processor to the started process on the peer's processor, and thus free some resources on the local processor. The start service request 300 may comprise a message type field 302, a plurality of flags field 304, a length field 306, a request serial number field 308, a host identity field 310, and a service name field 312.

The message type field 302 may comprise about 32 bits and have a value of about four that indicates the type of the start service request 300. The flags field 304 may comprise about 16 bits, set to a value of about zero by the sender, and ignored by the receiver. The length field 306 may comprise about 16 bits and indicate the length of the start service request 300, e.g., in bytes. The request serial number 308 may comprise about 32 bits and indicate the request serial number of the start service request 300, which may be created by the sender and included in the receiver's response. The host identity field 310 may comprise about 64 bits and represent the identity of the sending host or peer. The host identity field 310 may have a value that is generated by selecting the lowest machine address of a plurality of sender's Ethernet interfaces. The service name field 312 may indicate the requested service or process that the sender needs to start on the peer's processor. The service name may be represented by an American Standard Code for Information Interchange (ASCII) string that comprises the service name followed by a NULL (or zero) character.

Figure 4:
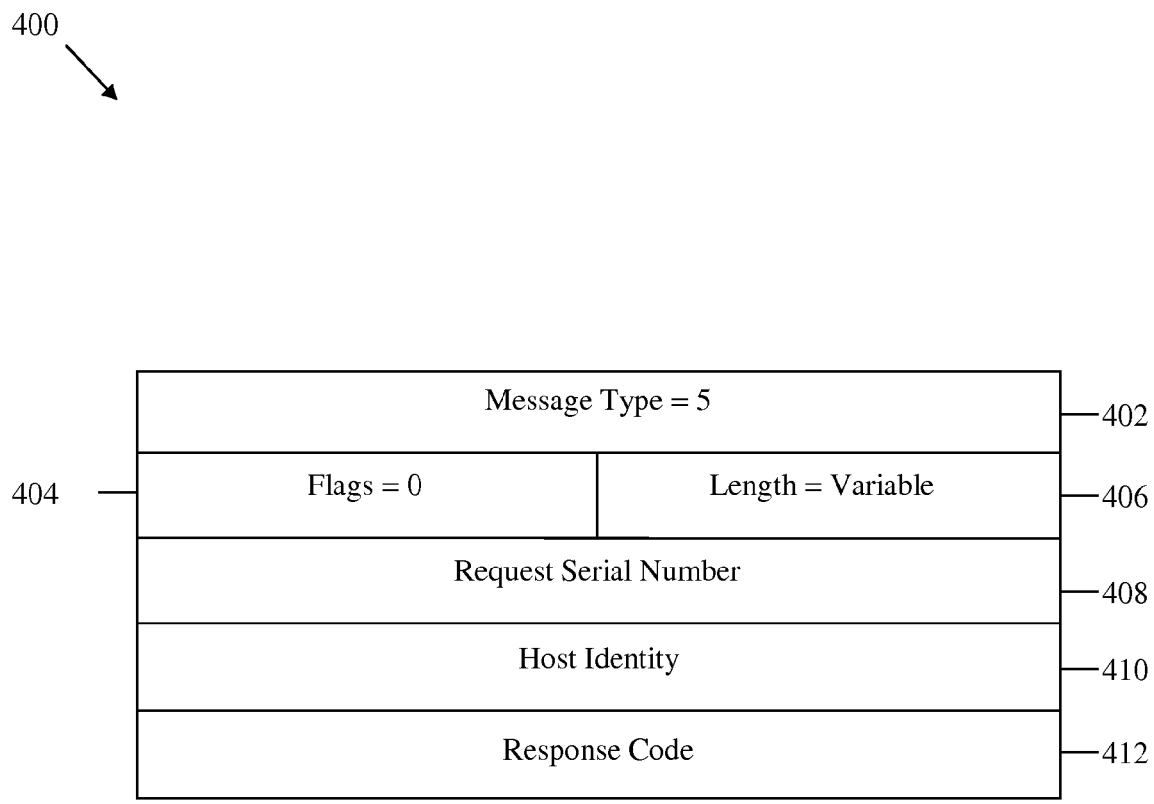
FIG. 4 is a schematic diagram of an embodiment of a start service response.

FIG. 4 illustrates an embodiment of a start service response 400, which may be an IRCP start service response message. The start service response 400 may be sent from a peer IRCP agent to an IRCP agent in response to an IRCP start service request, such as the start service request 300. The peer IRCP agent may send the start service response 400 to the IRCP agent to inform the IRCP agent of starting a new service or process or other responses, as described below. The start service response 400 may comprise a message type field 402, a plurality of flags field 404, a length field 406, a request serial number field 408, a host identity field 410, and a response code 412.

The message type field 402 may comprise about 32 bits and have a value of about five that indicates the type of the start service response 400. The flags field 404, length field 406, request serial number field 408, and host identity field 410 may be configured substantially similar to the flags field 304, length field 306, request serial number field 308, host identity field 310, respectively. The response code field 412 may comprise about 32 bits and may indicate one of the following response codes:

IRCP-NO-RESOURCE (1): This response may indicate that the sender is refusing to start the service due to lack of resources on its part.

IRCP-SVC-STARTED (2): This response may indicate that the requested service was started and is currently running on the senders platform.

IRCP-SVC-UNAVAIL (3): This response may indicate that the sender is unable to start the service, e.g., the service itself may refuse to start.

IRCP-SVC-ALREADY-RUNNING (4): This response may indicate that the sender already has the requested service running on its platform (e.g., processor).

IRCP-SVC-INVALID (5): This response may indicate that the sender found the service but for an unspecified reason could not start it.

IRCP-NO-SUCH-SVC (6): This response may indicate that the sender does not have a mapping for the requested service and thus does not know how to start it.

IRCP-INVALID-PEER (7): This response may indicate that the sender does not recognize the peer as valid.

IRCP-START-FAILED (8): This response may indicate that the sender attempted to start the service, but the startup procedure for the service failed.

IRCP-SVC-IN-FAILED-SATE (9): This response may indicate that the sender had the service running at one point but the sender has exceeded its restart threshold and cannot be restarted without manual intervention.

Figure 5:
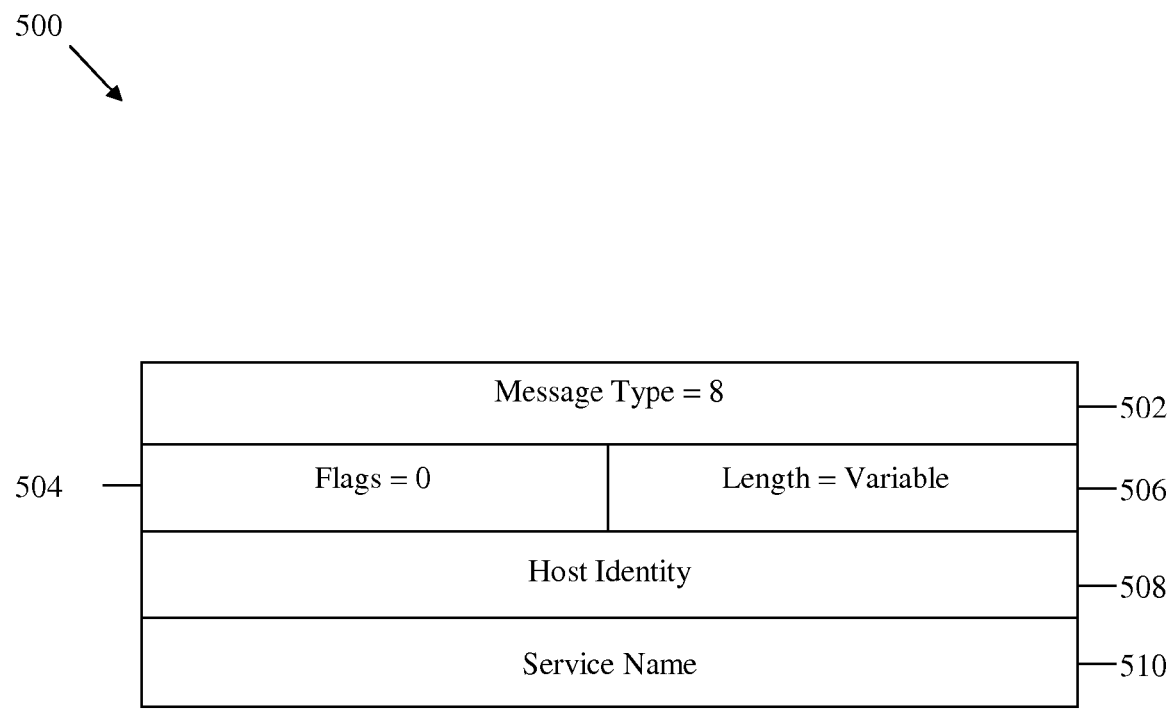
FIG. 5 is a schematic diagram of an embodiment of a service change message.

FIG. 5 illustrates an embodiment of a service change message 500, which may be an IRCP service change message. The service change message 500 may be sent by an IRCP agent to one or more peer IRCP agents to request adding or deleting a service in the peer service lists maintained by the peer IRCP agents. The IRCP agent may send the service change message 500 upon adding or deleting a service or process on the local processor to inform the peer IRCP agents of the service change. The service change message 500 may comprise a message type field 502, a plurality of flags field 504, a length field 506, a host identity field 508, and a service name field 510. The message type field 502 may comprise about 32 bits and have a value of about eight that indicates the type of the service change message 500. The flags field 504, length field 506, host identity field 508, and service name field 510 may be configured substantially similar to the flags field 304, length field 306, host identity field 308, and service name field 310, respectively.

Figure 6:
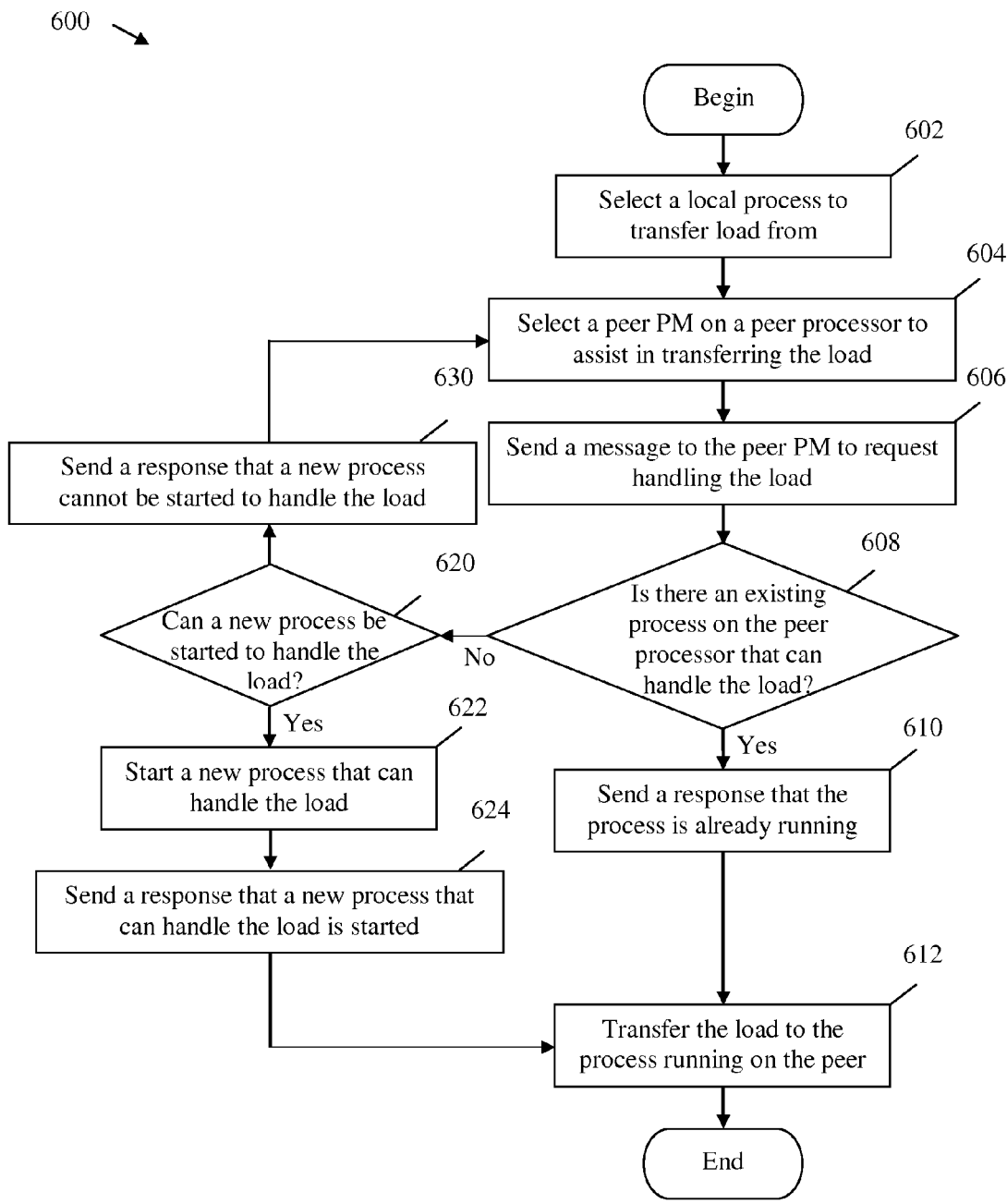
FIG. 6 is a flowchart of an embodiment of a dynamic process startup method.

FIG. 6 illustrates an embodiment of a dynamic process startup method 600, which may be implemented between a source processor and a target processor in a network component, such as a router or a switch. For instance, a source PM or IRCP agent, a target PM or IRCP agent, or both may be configured to support and/or implement the dynamic startup method 600. A PM, IRCP agent, or other process running on a processor may monitor resources and resource loading of one or more CPUs associated with the processor. If the IRCP agent or PM detects that the processor has become overloaded or that a routing process on the processor needs some assistance to implement its function, then the IRCP agent or PM may implement the method 600.

The method 600 may begin at block 602, where a local process may be selected to transfer load from. For instance, the PM may use some methodology to choose a local service that needs to be replicated to help off-load some of its current load (memory or CPU). At block 604, a peer PM on a peer processor may be selected to assist in transferring the load. A remote or peer PM may be chosen in a remote or peer CPU using a suitable methodology to help run the load. At block 606, a message may be sent to the peer PM to request handling the load. For instance, an IRCP start service request message, such as the start service request 300, may be sent to request from the peer PM to start a service or process that may match the selected local process (e.g., BGP).

At block 608, the method 600 may determine whether there is an existing process on the peer processor that can handle the load. The peer PM may receive the request message and examine the local capacity of the peer processor and whether the requested process or service is already running on the peer processor. If the condition in block 608 is true, then the method 600 may proceed to block 610. Otherwise, the method 600 may proceed to block 620. At block 610, a response may be sent that the process is already running. At block 612, the load may be transferred to the process running on the peer. Thus, the PM may off-load some load from the local process to the remote process, which may relieve the local processor that may be overloaded.

At block 620, the method 600 may determine whether a new process can be started to handle the load, e.g., on a peer processor. The peer PM may determine whether a corresponding processor may start a new process that can handle the load, e.g., that matches the selected local process, and whether the processor has available resources to accept the load. If the condition in block 620 is true, the method 600 may proceed to block 622. Otherwise, the method 600 may proceed to block 630. At block 622, a new process that can handle the load may be started. The remote PM may start the new process on the remote processor. At block 624, a response may be sent that a new process that can handle the load is started. For instance, an IRCP start service response message, such as the start service response 400, may be sent to indicate that the requested service is started. The method 600 may then proceed to block 612 to transfer the load to the new process. At block 630, a response may be sent that a new process cannot be started to handle the load. An IRCP start service response message, such as the start service response 400, may be sent to indicate that the requested service cannot be started. The method 600 may then return to block 604 to select another peer PM on another peer processor to assist in transferring the load.

Figure 7:
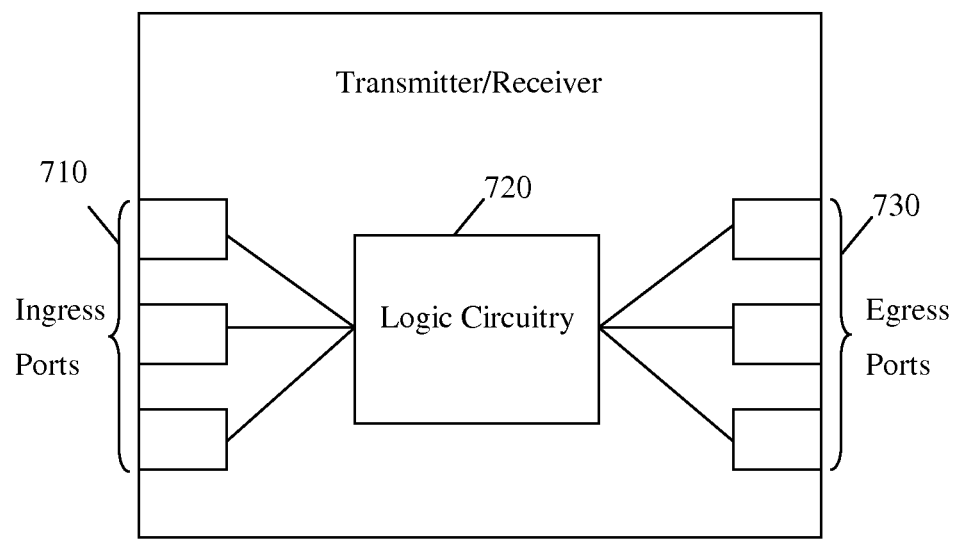
FIG. 7 is a schematic diagram of an embodiment of a transmitter/receiver unit.

FIG. 7 illustrates an embodiment of a transmitter/receiver unit 700, which may be any device that transports packets through a network. For instance, the transmitter/receiver unit 700 may be located in a network component, such as a router or a switch. The transmitted/receiver unit 700 may comprise one or more ingress ports or units 710 for receiving packets, objects, or Type-Length Values (TLVs) from other network components, logic circuitry 720 to determine which network components to send the packets to, and one or more egress ports or units 730 for transmitting frames to the other network components.

Figure 8:
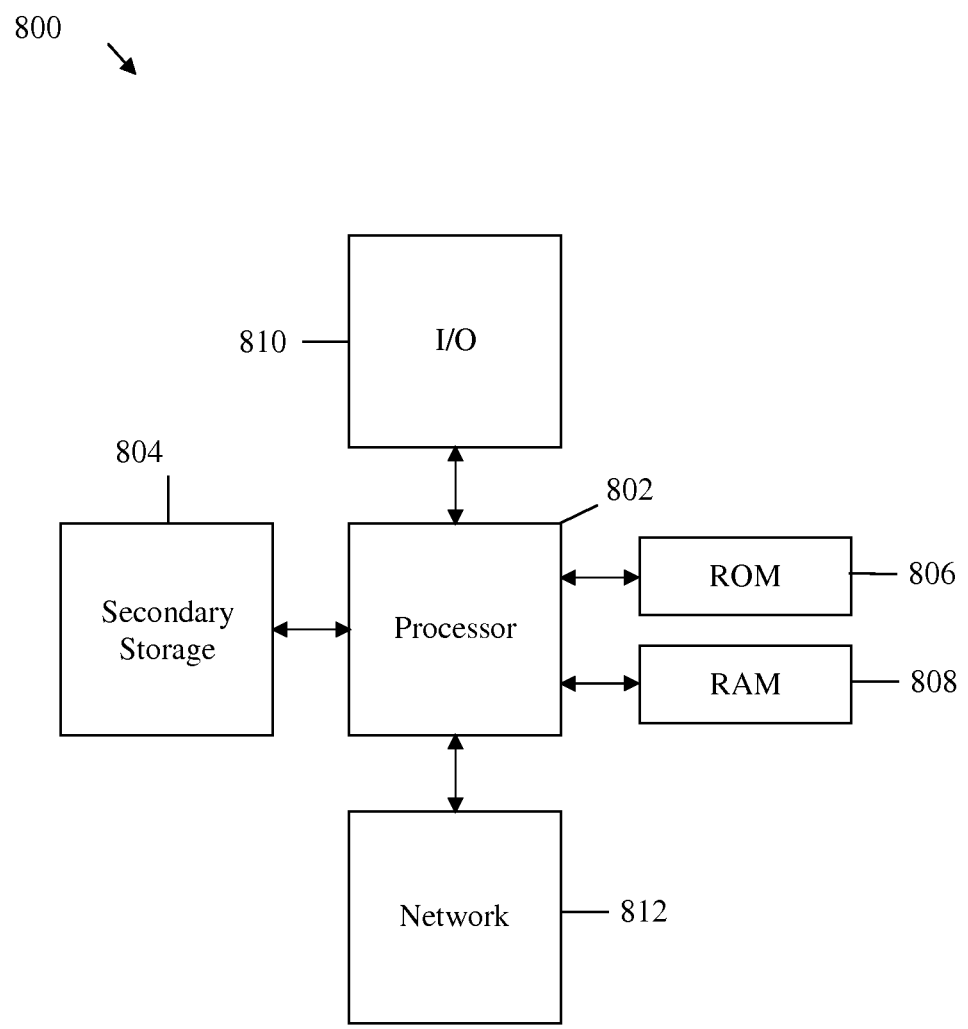
FIG. 8 is a schematic diagram of an embodiment of a general-purpose computer system.

The network components and/or methods described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor 802 may be implemented as one or more CPU chips, or may be part of one or more application specific integrated circuits (ASICs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a circuit board comprising:
a processor comprising a local process manager (PM) acting as an Internal Router Capability Protocol (IRCP) agent and configured to manage processes on the processor; and
a peer processor coupled to the processor and comprising a peer PM to manage processes on the peer processor,
wherein the local PM is configured to:
communicate with the peer PM to startup a peer process on the peer processor to accept a load of a local process on the processor; and
transfer the load to the peer process on the peer processor in a dynamic manner based on monitoring an amount of resources used by the processor,
wherein a value for overloaded count is incremented when an idle time central processing unit (CPU) percentage is smaller than or equal to a high water mark value,
wherein a value for current overloaded is incremented when a most recent sample is examined and the idle time CPU percentage is smaller than or equal to the high water mark value, and
wherein the local PM requests the startup of the peer process:
due to an overloaded CPU condition when the value for overloaded count is greater than or equal to a predetermined number and the value for current overloaded is not equal to zero; or
when a CPU is not overloaded and an idle time memory percentage is smaller than or equal to the high water mark value.

2. The apparatus of claim 1, wherein the processor and the peer processor are located on one of a single router and a switch, wherein the processor and the peer processor are configured to communicate with one another via an Internal Router Capability Protocol IRCP, and wherein the IRCP is configured to allow the processor to perform at least one of detect at least one peer processor, discover at least one capability of at least one peer processor in the apparatus, discover at least one running service on the peer processor, and migrate load to the peer processor.

3. The apparatus of claim 2, wherein the local PM is further configured to manage process startup, monitor at least one other process on the processor, and restart a failed process on the processor, and wherein the local PM is configured to communicate with the peer PM using the IRCP.

4. The apparatus of claim 2, wherein the IRCP agent is configured to monitor at least one process that runs on the processor and select the local process from the at least one process when an amount of resources of the processor utilized exceeds a threshold.

5. The apparatus of claim 4, wherein the IRCP agent maintains a peer service list that indicates at least one process available on at least one peer processor.

6. A network component comprising:
  a first processor card comprising a first processor configured to implement a local process, and a first agent process acting as an Internal Router Capability Protocol (IRCP) agent, wherein the first agent process is configured to:
    select the local process for load migration; and
    request startup of a remote process on a second processor to receive a migrated load from the local process upon detecting overloaded resources on the first processor; and
  a second processor card electrically coupled to the first processor card and comprising the second processor,
  wherein the second processor is configured to implement a second agent process that receives the request,
  wherein the second agent process is further configured to start a new process on the second processor to handle the migrated load from the first processor when the second processor is capable of implementing at least one service implemented by the local process and when the second process includes sufficient resources to handle the migrated load,
  wherein the local process is selected based on available resources for the local process,
  wherein a value for overloaded count is incremented when an idle time central processing unit (CPU) percentage is smaller than or equal to a high water mark value,
  wherein a value for current overloaded is incremented when a most recent sample is examined and the idle time CPU percentage is smaller than or equal to the high water mark value, and
  wherein the first agent process requests starting a remote process:
    due to an overloaded CPU condition when the value for overloaded count is greater than or equal to a predetermined number and the value for current overloaded is not equal to zero; or
    when a CPU is not overloaded and an idle time memory percentage is smaller than or equal to the high water mark value.

7. The network component of claim 6, wherein the second agent process migrates the load to a running remote process that is capable of handling the load instead of starting the new process and rejects the request when the second processor has insufficient resources to handle the load.

8. The network component of claim 6, wherein at least one of the first agent process and the second agent process sends a plurality of subsequent announcements at a plurality of time intervals, wherein each of the time intervals is equal to a sum of a predetermined IRCP announcement period and a jitter from zero to a few seconds.

9. The network component of claim 8, wherein the first agent process requests starting a remote process when a predetermined number of load samples is detected prior to sending an announcement.

10. The network component of claim 8, wherein the first agent process requests starting a remote process because a migration state machine is not running at the time of sending an announcement.

11. The network component of claim 8, wherein the first agent process sets the value for overload count to zero and the value for current overloaded to zero at the time of sending an announcement.

12. The network component of claim 6, wherein the first agent process, the second agent process, or both indicate whether a process is added or removed to update a peer service list that indicates available services on the first processor and the second processor.

13. A method comprising:
  receiving, at a local Internal Router Capability Protocol (IRCP) agent operating on a local processor positioned in a network component, one or more load transfer requests from a remote IRCP agent operating on a remote processor positioned in the network component, wherein the load transfer requests request transfer of a load from a remote process operating on the remote processor;
  in response to the load transfer requests from the remote IRCP agent and based on a determination that the existing processes operating on the local processor are unable to accept the load from the remote processor, starting a local process on the local processor to handle the load from the remote process on the remote processor; and
  receiving the load from the remote processor,
  wherein a value for overloaded count is incremented at the remote IRCP agent when a remote idle time central processing unit (CPU) percentage is smaller than or equal to a high water mark value,
  wherein a value for current overloaded is incremented at the remote IRCP agent when a most recent sample is examined and the remote idle time CPU percentage is smaller than or equal to the high water mark value, and
  wherein the load transfer request is received:
    due to an overloaded CPU condition at the remote processor when the value for overloaded count is greater than or equal to a predetermined number and the value for current overloaded is not equal to zero; or
    when the remote processor is not overloaded and an idle time memory percentage is smaller than or equal to the high water mark value.

14. The method of claim 13, wherein the request is received in an IRCP start service request message that comprises a message type field, a plurality of flags field, a length field, a request serial number field, a host identity field, and a service name field.

15. The method of claim 13, wherein the request is accepted or rejected by transmitting an IRCP start service response message that comprises a message type field, a plurality of flags field, a length field, a request serial number field, a host identity field, and a response code.

16. The method of claim 13 further comprising receiving a service change indication from the remote IRCP agent to inform a local process manager (PM) operating on the local processor of an addition or a deletion of a service maintained by the remote IRCP agent in a peer service list.

17. The method of claim 16, wherein the service change indication is received in an IRCP service change message that comprises a message type field, a plurality of flags field, a length field, a host identity field, and a service name field.

* * * * *